(12) United States Patent
Sato et al.

(10) Patent No.: US 6,246,890 B1
(45) Date of Patent: Jun. 12, 2001

(54) PORTABLE TELEPHONE WITH BUILT-IN CHARGER

(75) Inventors: Takehiko Sato; Kouichi Kunitomo, both of Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/901,604

(22) Filed: Jul. 28, 1997

(30) Foreign Application Priority Data

Aug. 2, 1996 (JP) .................................... 8-204435

(51) Int. Cl.[7] ...................................... H04B 1/38
(52) U.S. Cl. .......................... 455/573; 455/572; 320/127
(58) Field of Search .................................. 320/113, 111, 320/114, 115, 116, 118, 127, 132, 134; 455/127, 572, 573, 343, 574, 38.3

(56) References Cited

U.S. PATENT DOCUMENTS

| | | | |
|---|---|---|---|
| 4,266,178 | * 5/1981 | Asakawa | 320/101 |
| 4,622,507 | * 11/1986 | Persen | 320/111 |
| 5,148,043 | * 9/1992 | Hirata et al. | 307/66 |
| 5,182,509 | * 1/1993 | Simmonds | 320/131 |
| 5,304,915 | * 4/1994 | Sanpei et al. | 320/116 |
| 5,519,302 | * 5/1996 | Mino et al. | 320/148 |
| 5,547,775 | * 8/1996 | Eguchi et al. | 320/118 |
| 5,648,712 | * 7/1997 | Hahn | 320/111 |
| 5,686,815 | * 11/1997 | Reipur et al. | 320/116 |
| 5,747,189 | * 5/1998 | Perkins | 429/91 |
| 5,847,541 | * 12/1998 | Hahn | 320/111 |

\* cited by examiner

*Primary Examiner*—Nay Maung
*Assistant Examiner*—Sonny Trinh
(74) *Attorney, Agent, or Firm*—Pearne & Gordon LLP

(57) ABSTRACT

A portable telephone comprises a charging circuit for charging a battery with an external power supply, a voltage detector for detecting a terminal voltage of the battery, a memory storing charge-restart threshold voltages and charge-restart times corresponding to various use-states of the telephone, and a controller for monitoring the use-state of the telephone, selecting the optimum one of the charge-restart threshold voltage and optimum one of the charge-restart times in accordance with the use-state of the telephone, and carrying out timing control to recharge the battery.

5 Claims, 3 Drawing Sheets

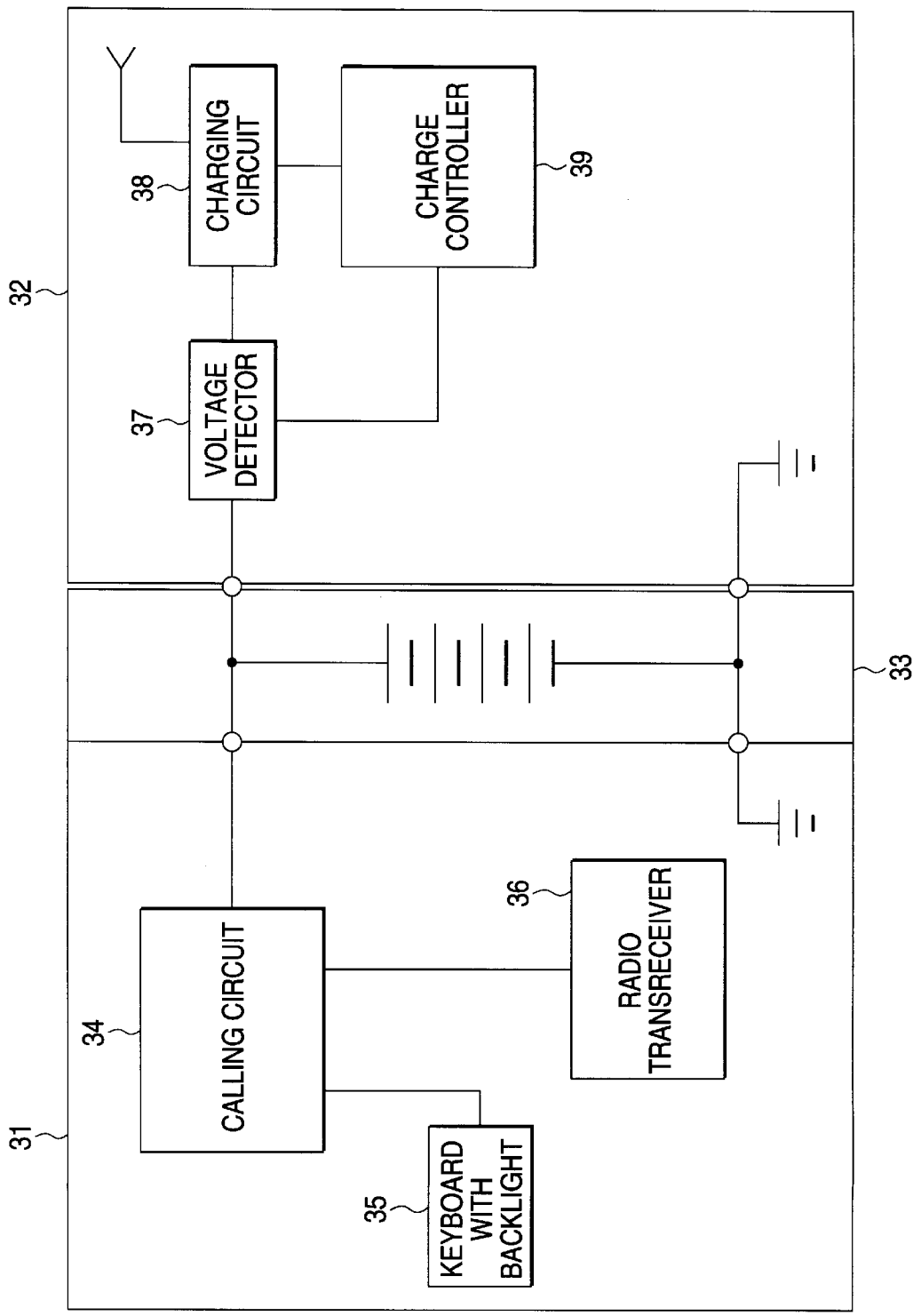

PORTABLE TELEPHONE WITH BUILT-IN CHARGER

BACKGROUND OF THE INVENTION

The present invention relates to a portable telephone with a built-in charger for use as a public communication apparatus.

A recent portable telephone uses a lithium battery or the like as a power source. In use of the portable telephone, the battery is discharged so that the discharged battery needs to be charged again. Recharge of the battery has been carried out by a charger provided separately from the portable telephone.

FIG. 3 shows the configuration of such a conventional portable telephone. In FIG. 3, the reference numeral 31 represents a portable telephone. A lithium-ion battery pack 33 is charged by a charger 32. A user makes the charger 32 carry out its charging operation while monitoring the respective terminal voltages of the portable telephone 31 and the lithium-ion battery pack 33 by a voltage detector 37 and controlling the charger 38 by a charge controller 39. At that time, the charge-restart is carried out when the terminal voltage of the lithium-ion battery pack 33 becomes lower than a charge-restart threshold voltage. One and the same table of the charge-restart threshold voltage is always used because the respective operation states of a calling circuit 34, a keyboard with backlight 35, a radio transceiver 36, etc. of the portable telephone 31 cannot be discriminated.

Since the charge-restart was thus carried out in the charger for the conventional portable telephone on the basis of a constant charge-restart threshold voltage regardless of the operation states of various sections, a problem was caused so that a lost of capacity of the battery after charge was generated when the load of the portable telephone was large, for example, when a charge-discharge-charge cycle was extremely short because of a terminal voltage drop at the time of speaking or backlight lighting.

SUMMARY OF THE INVENTION

The present invention is to solve the foregoing conventional problem, and it is an object of the invention to provide a portable telephone with a built-in charger, in which a battery can be always charged fully in any load condition of the portable telephone.

In order to attain the foregoing object, according to the present invention, a charging circuit is built-in a portable telephone. A charge-restart timer, and a charge-restart threshold voltage, and/or a charge-restart time are selected in accordance with the use-state of the portable telephone and the battery; and a terminal voltage, and/or a discharge time are monitored to make it possible to carry out proper charge/discharge control in accordance with the use-state of the portable telephone.

According to the present invention, provided is a portable telephone using a chargeable battery as a power source, comprising a charging circuit for charging said battery with an external power supply, a voltage detector for detecting a terminal voltage of said battery, a memory having charge-restart threshold voltages and/or charge-restart times stored therein in advance correspondingly to various use-states of said telephone, and a controller for monitoring the use-state of said telephone, selecting an optimum one of the charge-restart threshold voltages and/or an optimum one of the charge-restart times corresponding to the use-state at that time, and carrying out timing control to recharge said battery. Since the charge of the battery is started in accordance with the present use-state of the portable telephone, the battery can be always charged fully, and the loss of the battery capacity due to discharge can be reduced.

BRIEF DESCRIPTION OF THE DRAWINGS

FIG. 3 is a schematic block diagram of a conventional portable telephone.

DETAILED DESCRIPTION OF THE PREFERRED EMBODIMENTS

Figure 1:
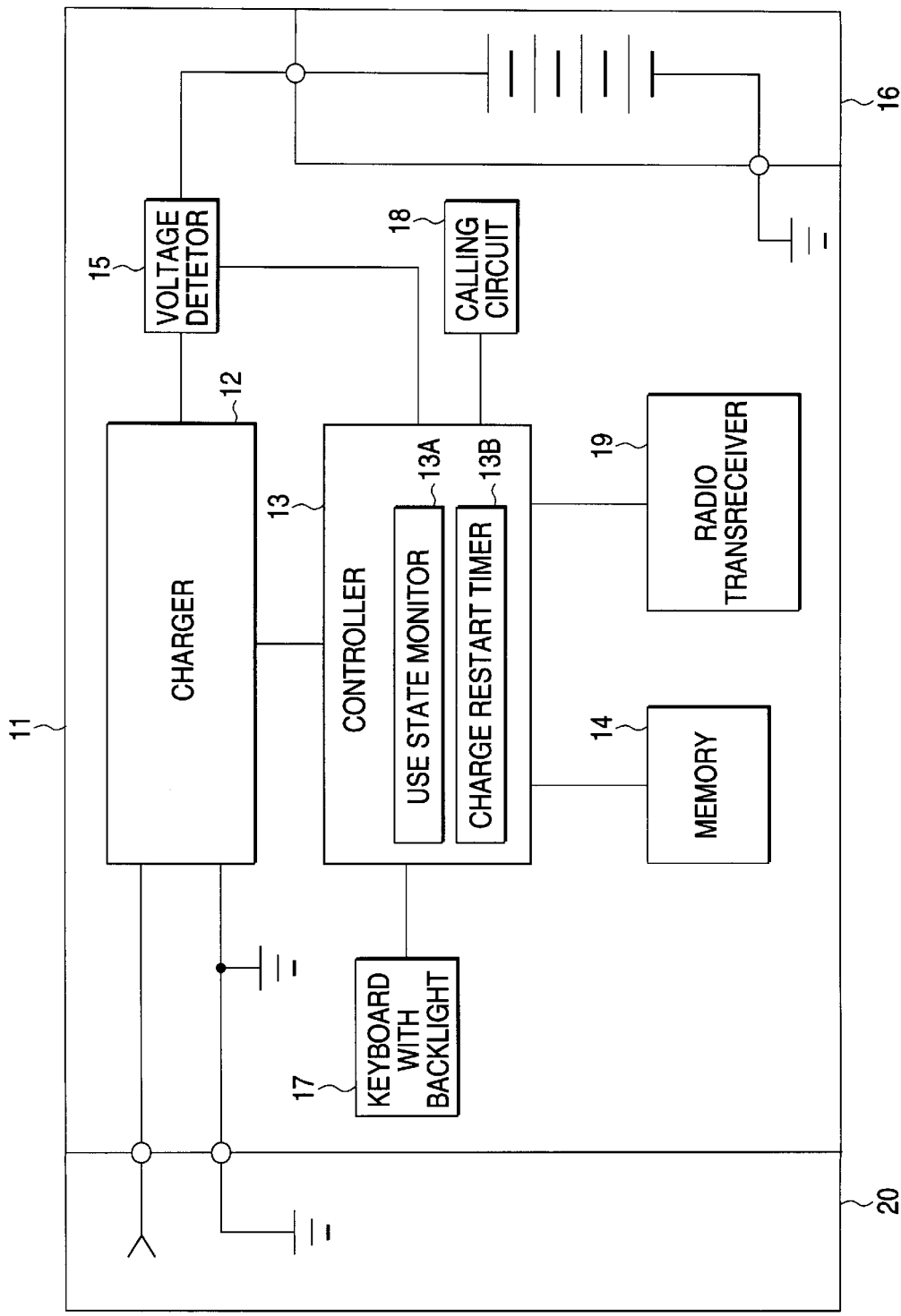
FIG. 1 is a schematic block diagram of a portable telephone with a built-in charger as an embodiment of the present invention.

An embodiment of the present invention will be described with reference to the drawings. FIG. 1 shows the configuration of a portable telephone 11 with a built-in charger as an embodiment of the present invention. In FIG. 1, the portable telephone 11 is constituted by: a charger 12; a controller 13 including a use-state monitor 13A, a charge-restart timer 13B and a CPU; a memory 14 carrying tables of charge-restart times $t_C$ and charge-restart threshold voltages $V_C$ stored therein; a voltage detector 15 for detecting a terminal voltage (battery remainder) of a lithium-ion battery pack 16; a keyboard 17 with backlight; a calling circuit 18; and a radio transceiver 19. The reference numeral 20 represents an external power supply for supplying external power to the portable telephone 11.

Figure 2:
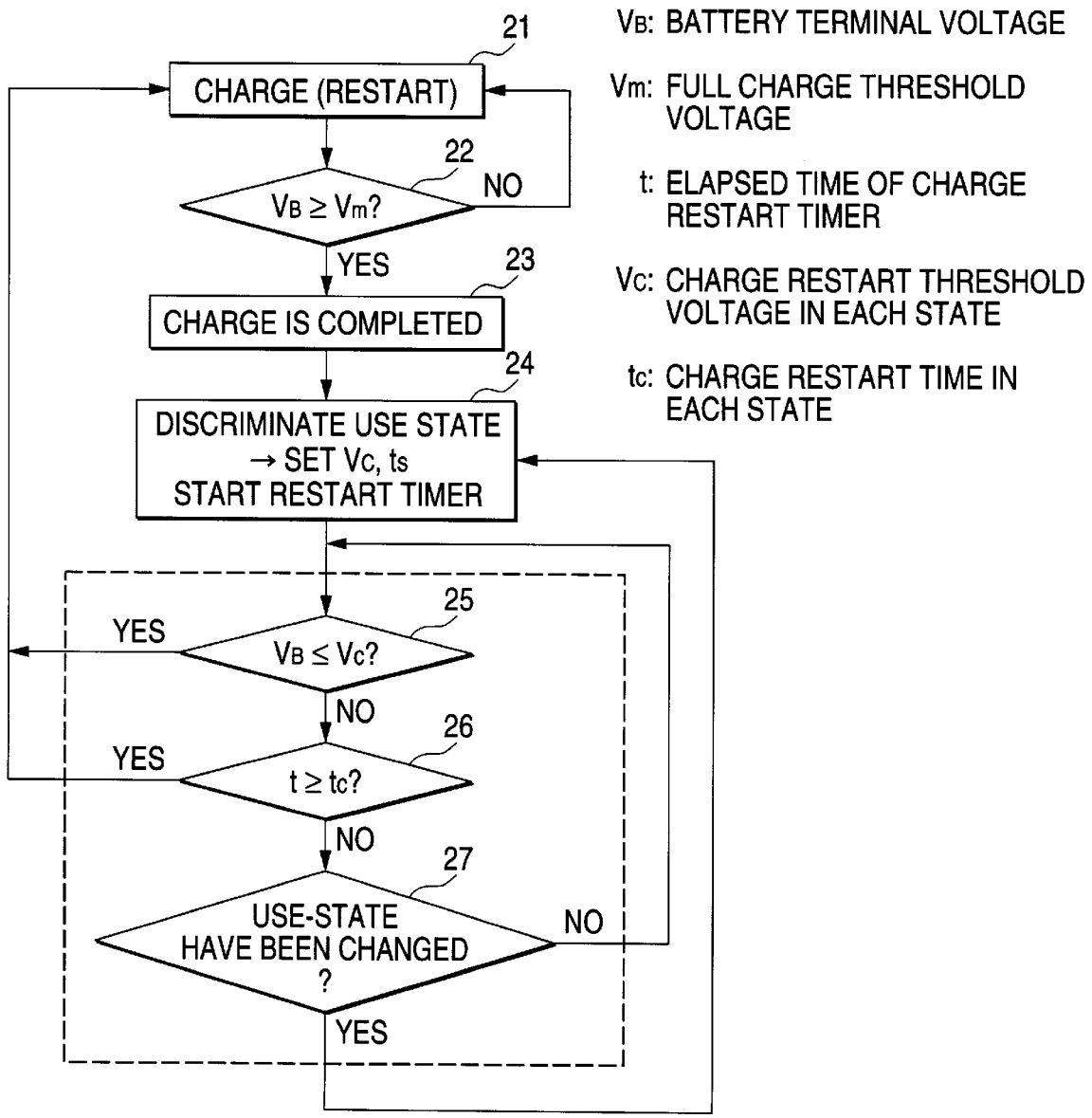
FIG. 2 is a flow chart showing the charge and charge-restart operations of the same.

Next, the operation of the above embodiment will be described with reference to FIG. 2. In this embodiment, a user attaches the portable telephone 11 to the external power supply 20 so as to carry out the charge operation (Step 21). This charge operation is controlled by the charging circuit 12 and the controller 13. The terminal voltage of the lithium-ion battery pack 16 is detected by the voltage detector 15. When the terminal voltage reaches a full charge threshold voltage Vm ("Yes" in Step 22), the charging circuit 12 and the controller 13 judges that the battery pack 16 is fully charged, and terminates the charge (Step 23).

After the charge, discharge is started with different current consumption in various use-states (such as power off, waiting-for, speaking, lighting of the keyboard with backlight, etc.) of the portable telephone 11. At that time, use-state monitor 13A detects the present use-state of the portable telephone 11, and selects optimum ones of the charge-restart threshold voltages $V_C$ and charge-restart times $t_C$ stored in advance in the memory 14 correspondingly to various use-states. In addition, the controller 13 starts the charge-restart timer 13B so that the charge-restart timer 13B counts the discharge elapsed time t since completion of the charge (Step 24).

The battery terminal voltage $V_B$ of the battery pack 16 is detected by means of the voltage detector 15 during the discharge, and the controller 13 compares the battery terminal voltage $V_B$ with the charge-restart threshold voltage $V_C$. When the value $V_B$ exceeds the value $V_C$, discharge is continued, while when the condition of $V_B \leq V_C$ is satisfied, the controller 13 makes the charging circuit 12 restart (Step 24).

In addition, the elapsed time t of the charge-restart timer 13B counted since the completion of the charge is also compared with the value $t_C$. When the value t does not reach the value $t_C$, discharge is continued, while when the condition of $t \geq t_C$ is satisfied, the charging circuit 12 is controlled to restart charge (Yes in Step 26).

Further, when the use-state of the portable telephone 11 changes during discharge ("Yes" in Step 27), the controller 13 selects again an optimum one of the charge-restart threshold voltages $V_C$ stored in the memory 14, starts the charge-restart timer 13B (Step 24), and carries out comparison in the same manner as mentioned above.

As has been described above, according to the above embodiment, the charge-restart threshold voltage $V_C$ and the charge-restart time $t_C$ corresponding to the use-state of the portable telephone 11 are selected to control charge. Accordingly, there is an advantage that it is possible to always charge the battery pack 16 fully, and it is possible to eliminate a loss of battery capacity.

Charge is carried out when a predetermined time has passed since the completion of charge in the above embodiment. In the use-state where current consumption is very much, however, a setting table where the charge-restart time is set to be $t_C=0$ is used so that the battery can be always put in the charge state. In addition, only either one of the charge-restart threshold voltage $V_C$ and the charge-restart time $t_C$ may be used as a parameter for controlling charge. Alternatively, the temperature of the battery may be added as a further parameter to the charge-restart threshold voltage $V_C$ and the charge-restart time $t_C$.

As is apparent from the above embodiment, the present invention has such an effect, as a portable telephone with a built-in charger, that charge/discharge is controlled by a charge-restart threshold voltage and/or a charge-restart time, so that the battery can be charged fully regardless of the use-state of the portable telephone.

What is claimed is:

1. A portable telephone using a chargeable battery as a power source, comprising:

a charging circuit for charging said battery with an external power supply;

a voltage detector for detecting a terminal voltage of said battery;

a memory having charging condition data stored therein in advance corresponding to various use-states of said telephone during discharge of said battery; and a controller for monitoring the use-state of said telephone during discharge of said battery, selecting an optimum one of the charging condition data corresponding to the use-state at that time, and carrying out timing control during recharge of said battery.

2. The portable telephone as claimed in claim 1, wherein said charging condition data is charge-restart threshold voltages corresponding to various use-states of said telephone.

3. The portable telephone as claimed in claim 1, wherein said charging condition data is charge-restart times corresponding to various use-states of said telephone.

4. The portable telephone as claimed in claim 1, wherein said charging condition data is charge-restart threshold voltages and charge-restart times corresponding to various use-states of said telephone.

5. A portable telephone using a chargeable battery as a power source, comprising:

a charging circuit for charging said battery with an external power supply;

a voltage detector for detecting a terminal voltage of said battery;

a use-state monitor for detecting a present use-load state of said portable telephone during discharge of said battery;

a memory having charge-restart threshold voltages and charge-restart times stored therein in advance corresponding to various use-load states of said portable telephone during discharge of said battery;

a timer which starts upon completion of charging of said portable telephone; and a controller which selects one of said charge-restart threshold voltages and one of said charge-restart times from said memory corresponding to the use-load state when said use-state monitor detects a change in the use-load state of said portable telephone, restarts said charging circuit when the voltage detected by said voltage detector is not higher than the selected charge-restart threshold voltage or when a count of said timer exceeds the selected charge-restart time, and finishes charge when the voltage detected by said voltage detector exceeds a predetermined full-charge threshold value.

* * * * *

UNITED STATES PATENT AND TRADEMARK OFFICE
CERTIFICATE OF CORRECTION

PATENT NO.     : 6,246,890 B1                                    Page 1 of 1
DATED          : June 12, 2001
INVENTOR(S)    : Sato et al.

It is certified that error appears in the above-identified patent and that said Letters Patent is hereby corrected as shown below:

<u>Title page,</u>
Item [56], U.S. PATENT DOCUMENTS, after line 1, insert the following:
-- 5,150,031    9/1992      James et al.
   5,191,277    3/1993      Ishikura et al.--

Item [56], FOREIGN PATENT DOCUMENTS, insert the following:
--2 262 004     6/1993      United Kingdom
  2 242 793     10/1991     United Kingdom
  W094/07293    3/1994      WIPO --

Signed and Sealed this

Ninth Day of April, 2002

*Attest:*

*Attesting Officer*

JAMES E. ROGAN
*Director of the United States Patent and Trademark Office*